(12) United States Patent
Edwards

(10) Patent No.: US 7,392,514 B2
(45) Date of Patent: Jun. 24, 2008

(54) DATA FLOW CHASING

(75) Inventor: Andrew James Edwards, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 10/609,188

(22) Filed: Jun. 26, 2003

(65) Prior Publication Data

US 2004/0264367 A1 Dec. 30, 2004

(51) Int. Cl.
*G06F 9/45* (2006.01)
(52) U.S. Cl. ....................................... 717/156
(58) Field of Classification Search ................... 717/156
See application file for complete search history.

(56) References Cited

U.S. PATENT DOCUMENTS

| | | | | |
|---|---|---|---|---|
| 5,485,616 | A * | 1/1996 | Burke et al. ................. | 717/133 |
| 5,812,855 | A * | 9/1998 | Hiranandani et al. ........ | 717/157 |
| 6,457,023 | B1 * | 9/2002 | Pinter et al. ................. | 707/206 |
| 7,010,783 | B2 * | 3/2006 | de Jong ....................... | 717/131 |

OTHER PUBLICATIONS

Brendon Cahoon et al.; Data Flow Analysis for Software Prefetching Linked Data Structures in Java; International Conference on Parallel Architectures and Compilation Techniques, Barcelona, Spain; Sep. 2001; 13 pages.
Stephen Adams et al.; Speeding Up Dataflow Analysis Using Flow-Insensitive Pointer Analysis; undated; pp. 1-10.
Ambitabh Srivastava et al.; Vulcan Binary Transformation on a Distributed Environment; Technical Report; Apr. 20, 2001; pp. 1-12.
Erik Ruf; Optimizing Sparse Representations for Dataflow Analysis; Technical Report; Mar. 3, 1995; 13 pages.
Michael D. Smith; Machine SUIF; Jun. 2000; 11 pages.
Monica Lam; An Overview of the SUIF2 System; 2000; 5 pages.

* cited by examiner

*Primary Examiner*—John Chavis
(74) *Attorney, Agent, or Firm*—Klarquist Sparkman, LLP

(57) ABSTRACT

Existing systems use interprocedural data flow to analyze the source code of an entire program thereby requiring significant resources. Instead forward and backward chase components reference data structures (e.g., state machines) that identify instructions within a intraprocedural data flow graph. Based on how states of the state machine correspond to instructions in the data flow, the state machines direct the data flow chase to other procedures in a call graph, to instructions indicated in a global reference list, to instructions indicated in a field reference list, to instructions indicated by a pointer dereference, or to another instruction in the present procedure. Then, the chase continues in the data flow graph of the procedure containing the instruction.

30 Claims, 16 Drawing Sheets

402 → call malloc     //store call results in eax
                                          408
404 → mov  [ebp + offset] , eax
       410
406 → cmp  [ebp + offset] , 0

412 → bne    address    //branch if memory obtained

414 → branch  error     //raise exception if no memory

510
506 → mov  eax , &global  //global is DLL name
       508
504 → push  eax    512
502 → call dword ptr [_imp_LoadLibraryA@4]

FIG. 6

```
bar ()          602
{
int * p = (int *) malloc (size of (int));
foo (p)                         604
//top (p)   ←— 606
}
foo (int * p)
{                608
       *p = 0;        //start here and go backward
}
```

FIG. 7

| Instruction Address | OP CODE | OPERANDS | Comments |
|---|---|---|---|
| | | | //Begin Bar () |
| A | push | 4 | //create holder for integer |
| B | call | malloc | |
| C | push | eax | //temp var on stack |
| D | call | foo | //temp becomes parameter to foo |
| E | ret | | //End Bar() |
| | | | //Begin foo () |
| F | mov | eax, [esp+4] | //parameter ——▶ eax |
| G | mov | eax, 0 | //set p=0; |
| H | ret | | //End foo () |

| Addresses | Data | States |
|---|---|---|
| B | eax | 202  810 |
| C | eax | 204  812 |
| C | $temp_0$ | 202  814 |
| D | $temp_0$ | 214  816 |
| D | $parameter_0$ | 216  818 |
| F | $parameter_0$ | 202  820 |
| F | eax | 204 |
| G | eax | 202 |

FIG. 10

| Address | Data | State |
|---|---|---|
| G | eax | 302 |
| F | eax | 304 |
| F | parameter$_0$ | 302 |
| D | parameter$_0$ | 312 |
| D | temp$_0$ | 310 |
| C | temp$_0$ | 302 |
| C | eax | 304 |
| B | eax | 302 |

| Addressing form 1102 | Resolves to 1103 |
|---|---|
| [global + imm] 1104 | Static data inside global (immediate or another global)<br>If (global is written dynamically)<br>    Instructions that store into the global. 1106 |
| [global + scale * reg + imm] 1108 | if (reg can be chased to immediate)<br>    Static data inside global at offset (immediate or another global)<br>    If (global is written dynamically) 1110<br>        Instructions that store into the global at offset.<br>else<br>    All static data inside global (immediate or another global)<br>    If (global is written dynamically) 1114<br>        Instructions that store into the global. |
| [reg + imm] 1118 1116 1120 | If (reg can be chased to global)<br>    data inside global at offset (immediate or global)<br>    If (global is written dynamically at offset)<br>        Instructions that store into the global at offset<br>If (reg can be chased to type)<br>    instructions that store to field |
| [reg + scale * reg' + imm] 1122 1124 1128 1126 | If (reg can be chased to global)<br>    if (reg' can be chased to immediate)<br>        data inside global at offset (immediate or global)<br>        If (global is written dynamically at offset)<br>            Instructions that store into the global at offset<br>    Else<br>        All data inside global (immediate or global)<br>        if (global is written dynamically)<br>            All instructions that store into the global<br>If (reg can be chased to type)<br>    instructions that store to field array |

| //Definition | Use | Address |
|---|---|---|
| mov [reg + <offset of i in T>], 0 | push [reg + <offset of i in T>] | 73F4<br>89AB |

FIG. 14

```
bar ()
{
    T * t;
    t -> i = 0;
    foo (t);
} foo (T * t)
{
    print (t -> i);
}
```

| //Definition | Use | Address |
|---|---|---|
| mov [g + 4], 10 | mov reg, [g + 4] | CF15<br>F11F |

```
/* Description:
 *   VChase is a class that can be used to follow data flow around a program
 */
class VChase        ◄—1702
{
public:
    // Create a chase object for some data at an instruction   ◄—1704
    static VULCANDLL VChase * VULCANCALL Create( VOperand op, VInst *pInst,
VProc *pProc, VComp *pComp );

// Free memory assoicated with this object (and optionally the whole set)
    virtual void Destroy(bool fSet = true) = 0;
                                              ◄—1706
    enum ChaseType
    {
        ctRegister = 0,    1708
        ctSymbol   = 1,
        ctGlobal   = 2,
        ctImmediate = 3,
        ctPointer = 4,
        ctArray = 5,
        ctDataMask = 7,
        ctLEA = 8,
        ctLEASymbol = ctLEA | ctSymbol,
        ctLEAGlobal = ctLEA | ctGlobal,
        ctLEAPointer = ctLEA | ctPointer,
        ctLEAArray = ctLEA | ctArray,
        ctReturn = 16,
        ctCantContinue = 32
    };
                                                    ◄—1710
    // Get the current type of this chase object
    virtual ChaseType Type() = 0;

// Get the location of this chase object         ◄—1712
    virtual VInst *Inst() = 0;
    virtual VProc *Proc() = 0;
    virtual VComp *Comp() = 0;
                                                    ◄—1714
    // Get the contents of this chase object
    virtual ERegister Register() = 0;
    virtual VInstance *Instance() = 0;
    virtual VBlock *Global() = 0;
    virtual DWORD Immediate() = 0;
    virtual const VAddress *Pointer() = 0;
    virtual const VAddress *Array() = 0;
```

FIG. 18

```
// Does this object represent the return value from a call?
virtual bool IsCall() = 0;    ←—1802

// Get the next chase object in this set
virtual VChase *Next() = 0;    ←—1804
                                              1806
// Chase across 1 thing and return set of new objects
virtual VChase *ChaseBackward() = 0;
virtual VChase *ChaseForward() = 0;

1808
// Chase back to a symbol
virtual VType *ChaseToType() = 0;
virtual VInstance *ChaseToInstance() = 0;
                                                          1810
// Chase until callback returns true
typedef bool (VULCANCALL *PFNCHASEDONE)(VChase *pCur);
virtual VChase *ChaseBackTo(PFNCHASEDONE) = 0;
virtual VChase *ChaseForwardTo(PFNCHASEDONE) = 0;

// Return type from IDone::Done (unavailable from static callback)
enum ChaseDone
{                       1812
    cdContinueDiscard,
    cdDoneKeep,
    cdContinueKeepAsFrom,
    cdDoneDiscard,
};

// Chase using interface for callback
class IDone           ←—1814
{
public:
    virtual ChaseDone VULCANCALL Done(VChase *pCur) = 0;   ←—1816
};
virtual VChase *ChaseBackTo(IDone * = NULL) = 0;
virtual VChase *ChaseForwardTo(IDone * = NULL) = 0;    ←—1818

// Get the next node kept onlong the path
virtual VChase *From() = 0;
                                              1820
// Predefined stopping routines for ChaseBackTo
static VULCANDLL bool VULCANCALL DoneAtType(VChase *);
static VULCANDLL bool VULCANCALL DoneAtImm(VChase *);
static VULCANDLL bool VULCANCALL DoneAtPointer(VChase *);
static VULCANDLL bool VULCANCALL DoneAtGlobal(VChase *);
static VULCANDLL bool VULCANCALL DoneAtLEA(VChase *);
static VULCANDLL bool VULCANCALL DoneAtCALL(VChase *);
};
```

FIG. 19

```
                    1904                            1902
VInstance *pParam = pProc->FirstCallParam( pCallLL, pComp );
               1908                  1906
VChase *pChase  = VChase::Create( pParam, pCallLL, pProc );
                                  1910        1912
VChase *pDLLName = pParam->ChaseBackTo( VChase::DoneAtGlobal );
for (VChase *p = pDLLName; p != NULL; p = p->Next())
{                                        1914
  printf("%s\n", p->Global()->Raw() );
}
```

DATA FLOW CHASING

TECHNICAL FIELD

The technical field relates to the static analysis of specified data as it flows through different locations within a program.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Existing data flow analysis systems use data flow to analyze the source code of an entire program. Typically, an entire program is analyzed to determine where all data is used and where it originates. These methods are called interprocedural data flow analysis, and they utilize significant resources such as memory and execution time.

Additionally these prior methods limit data analysis to the abstract syntax trees derived from the source of a program. They do not analyze the data flow after the program has been transformed into binary code.

SUMMARY

The described technologies provide methods and systems for performing data flow analysis on specified data.

On example of a method or system described herein, provides forward and backward chase components that reference data structures that identify instructions within a data flow graph. Based on instructions identified in a data flow graph, the data flow chase is directed to other procedures in a call graph, to instructions indicated in a global reference list, to instruction indicated in a field reference list, to instructions indicated by a pointer dereference, or to a next instruction in the present data flow graph. Other examples described herein discuss many other methods and systems for performing data flow chasing.

Additional features and advantages will be made apparent from the following detailed description, which proceeds with reference to the accompanying drawings.

BRIEF DESCRIPTION OF THE DRAWINGS

FIG. 4 is an exemplary program listing with an overlay of an exemplary data flow graph.

FIG. 5 is an exemplary program listing with an overlay of an exemplary data flow graph.

FIG. 6 is a source code listing of an exemplary program under analysis.

FIG. 7 is an exemplary assembly language listing of the compiled source code of FIG. 6.

FIG. 10 is an exemplary state transition trace for a backward trace.

FIG. 11 is an exemplary table for resolving a pointer memory dereference.

FIG. 14 is an exemplary program listing describing a field reference list feature.

FIG. 15 is an exemplary global reference list.

FIG. 17 is an exemplary program listing of an application programming interface for creating chase objects.

FIG. 18 is an exemplary application programming interface for creating chase objects for backward or forward chases through an internal representation of a program.

FIG. 19 is an exemplary program listing using a application programming interface.

DETAILED DESCRIPTION

Overview

The following examples describe methods and systems for providing data flow chasing. The described data flow chasing analysis starts focused on a point of interest, without requiring the entire program's data flow analysis. The described data flow chasing is performed with binary code input instead of source code.

Thus, along with the binary code for the program of interest, the user supplies a start state or data point of interest. From the start state, the data is followed forward or backward as directed by the user.

The data point is chased wherever it goes interprocedural or into other binary files within the program. The data is followed through procedure calls, and a tree is built of the one or more data flow paths that the data could travel backward or forward according to wherever that data moves.

Since the described data flow chasing is used for static analysis instead of optimization, a complete answer is not required. Thus, if a data flow path is labeled indeterminate, this is acceptable. If desirable, any indeterminate path is reported as an unknown data flow path.

The described data flow chase methods and systems are useful for many reasons, for example, defect detection, debugging, walking back through crash dumps, and or for analyzing programs to obtain information.

Exemplary Data Chase Method

Figure 1:
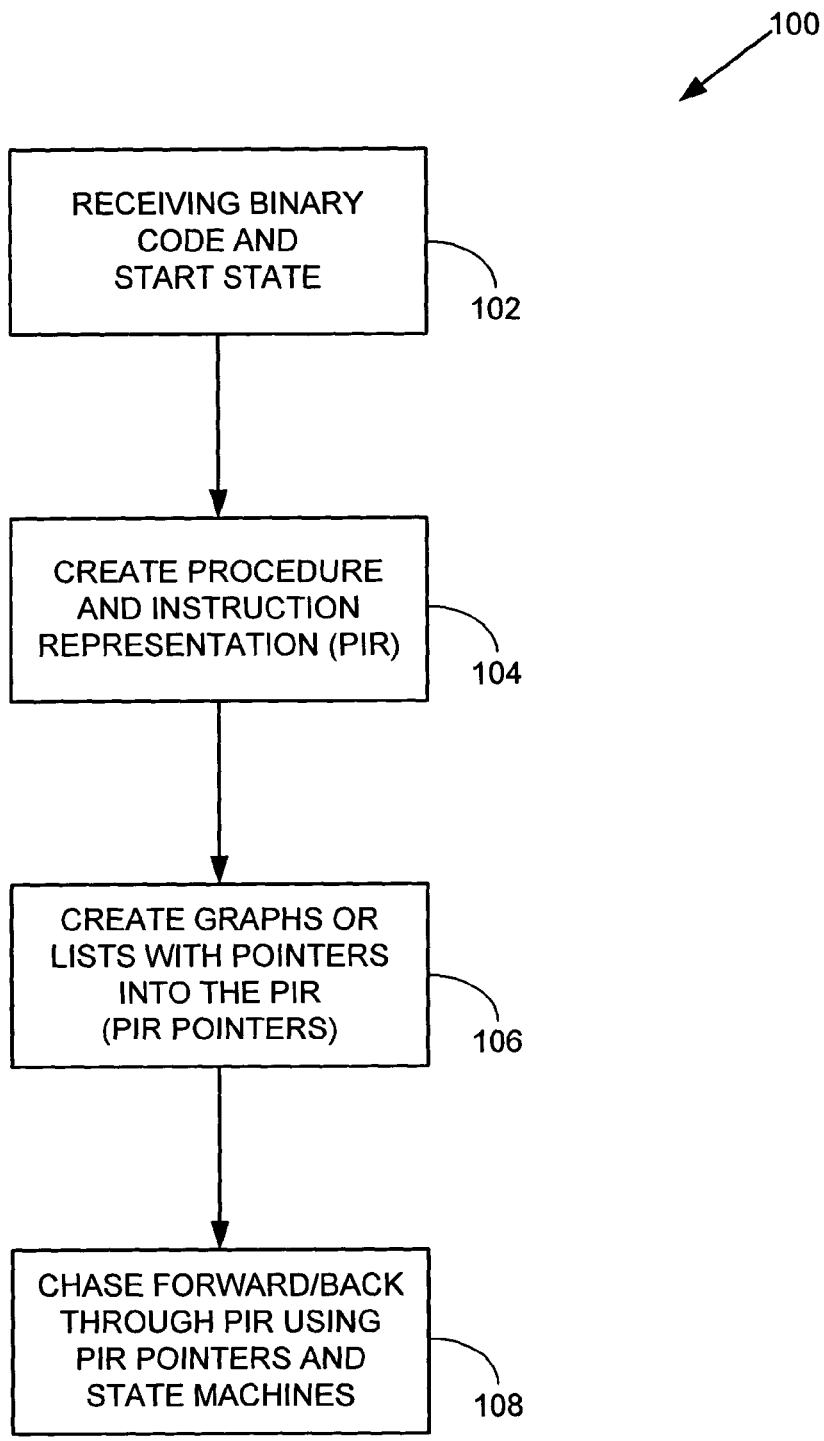
FIG. 1 is a flow chart for an exemplary method for data flow chasing.

FIG. 1 is a flow chart for an exemplary method for data flow chasing.

At 102, the method receives an identification of binary code, a start state, and a chase direction. In one example, a start state is represented by an instruction location and the data at that location. Thus, for a "mov eax, 0" assembly statement, the start state would be the address (i.e., instruction location) of the mov instruction, and the data being traced into or out of the eax register (i.e., data location). The binary code would be one or more binary files from a program of interest.

The start state is contained within the program.

At 104, the method creates a program and instruction representation (PIR) from the binary code. The PIR is a data structure (e.g., a list, tree, or graph) holding information about the program such as procedures and instructions. The PIR may also contain translations of the binary code into human comprehendible instructions (i.e., assembly/source code), that can be shown to the user.

At 106, the method creates several graphs or lists that include pointers into the PIR. In one example, a control flow graph (CFG) is created to show branches within procedures in the (PIR), and a call graph (CG) is created to show procedures that call, or are called by, other procedures. In another example, a data flow graph (DFG) is created (e.g., def-use chain or single static assignment (SSA)) to show data definition and uses within procedures, and a field reference list (FRL) is created to show where data of a type is referenced within a program. In another example, a global reference list (GRL) is created to show where a global data is referenced within a program. One or more of these graphs or lists include pointers into the PIR, indicating locations where members of the graphs or lists (e.g., procedures and instructions) are located within the PIR.

At 108, from the start state a data flow instance is chased in the defined direction. The data instance is chased through the data flow graph defined for a procedure (e.g., see Exemplary Data Flow Graph). Once a data of concern is traced forward or backward to a procedure transition instruction (i.e., a procedure call or return in a forward chase, or the first instruction within a procedure in a backward chase), the CG is consulted to determine what procedures are called by, or call this procedure. The CG contains pointers into the PIR where the caller or callee procedures are located. Thus, the CG is used to expand the data flow chase outside and through other procedures. If plural procedure transition instruction paths are relevant to a data flow chase, then each path is followed. A data flow chase tree is created for the plural paths traversed according to the DFG for each procedure.

If an operand with a pointer dereference (i.e., [ptr]) is encountered in a chase (e.g., (mov [ptr], 0) or (add eax, [ptr])) is encountered within a DFG, that pointer is chased backward to determine where it may point. A pointer analysis table is used to determine which backward chase is performed (e.g., see Exemplary Pointer Memory Dereference). By determining where the pointer points, the memory dereference is resolved to a target of the pointer (i.e., a field reference, a global reference, or an immediate reference), so the data flow analysis can continue using the target.

For example, if the target is resolved to a global reference, then a global reference list (GRL) is used to determine all uses of the reference relevant to the present data flow analysis. If the target is resolved to a field reference, then the field reference list (FRL) is used to find all the locations in the program relevant to analysis of that target. For example, if the backward chase determines that a memory dereference pointed at a global variable, then the GRL is used to determine all uses of that global variable within the program. Thus, data flow leaving a procedure is chased not only through procedural calls using the CG, but also through pointer dereferences using a backward chase in conjunction with a GRL, or a FRL. These graphs and lists point into the PIR and indicate where to continue the chase. In one example, as each new instruction is identified within the PIR, a user is presented with the instruction or the state of that instruction so they may determine whether or not to stop the chase. In another example, the input could include a description of a desired stop state, and the chase continues down each path, and presents the user with the location(s) of the end state(s). Optionally, the user is presented with the chase state steps leading to the desired end state(s).

Exemplary Data Flow Graphs (DFG)

A def-use chain (or SSA) is a common representation for data flow analysis and contains information local to a procedure. It tells where data is defined (def) and where it is used (use) within a procedure.

In compiler terms, the definition (def) of a data element is where data value is assigned (e.g., mov eax, 0), whereas, a use is when the data element is later used. For example, if the value in eax is later incremented (e.g., add eax, 1), that is a use.

Thus, the DFG includes an edge from the operands in the move instruction to the add instruction. The bidirectional edges of the DFG tell within a procedure, all the places where the relevant data could have come from or gone to. By following the DFG, a data flow chase provides a step-by-step data flow within the procedure.

Figure 2:
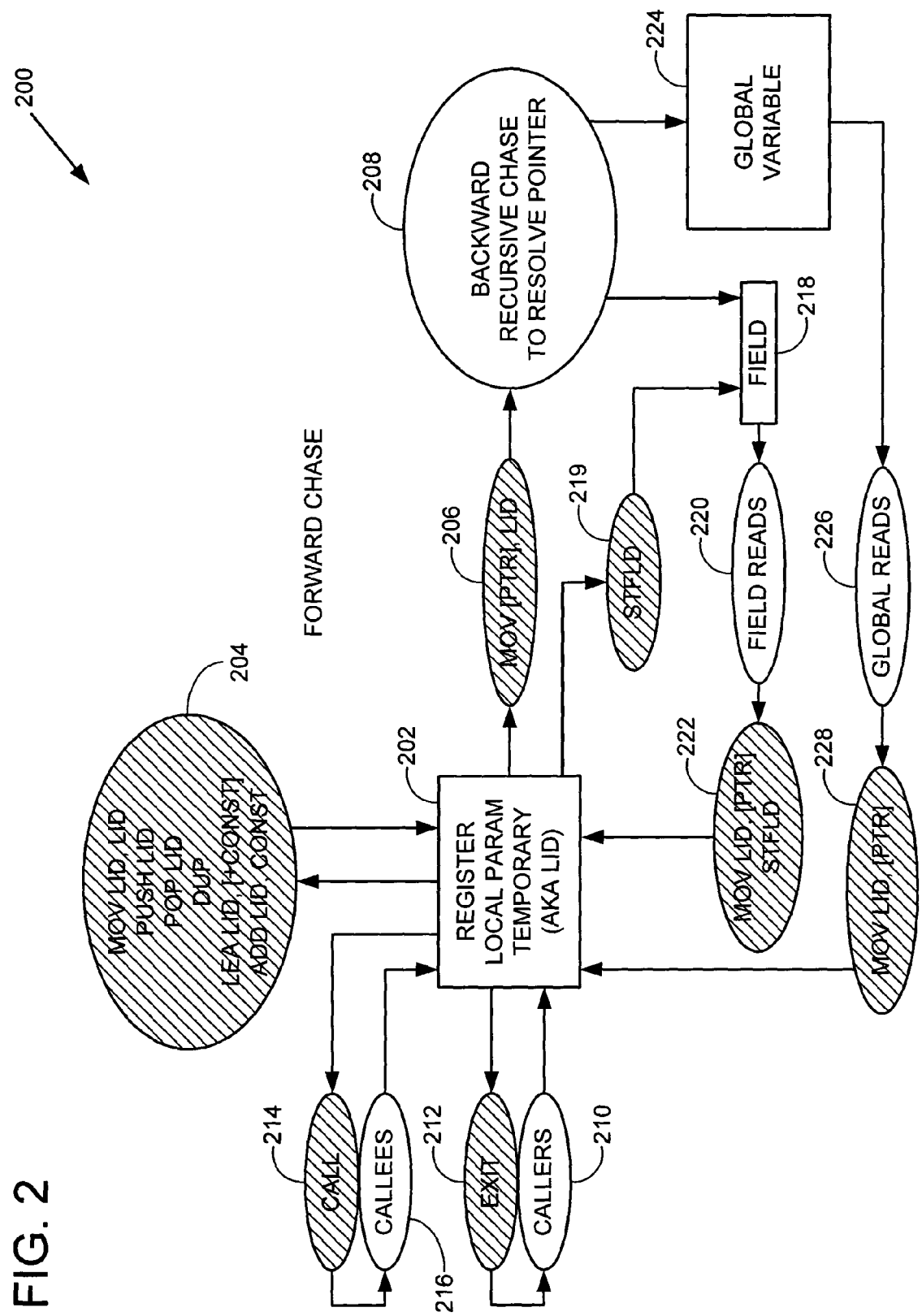
FIG. 2 is an exemplary state machine for data flow chasing forward through a program.
Figure 3:
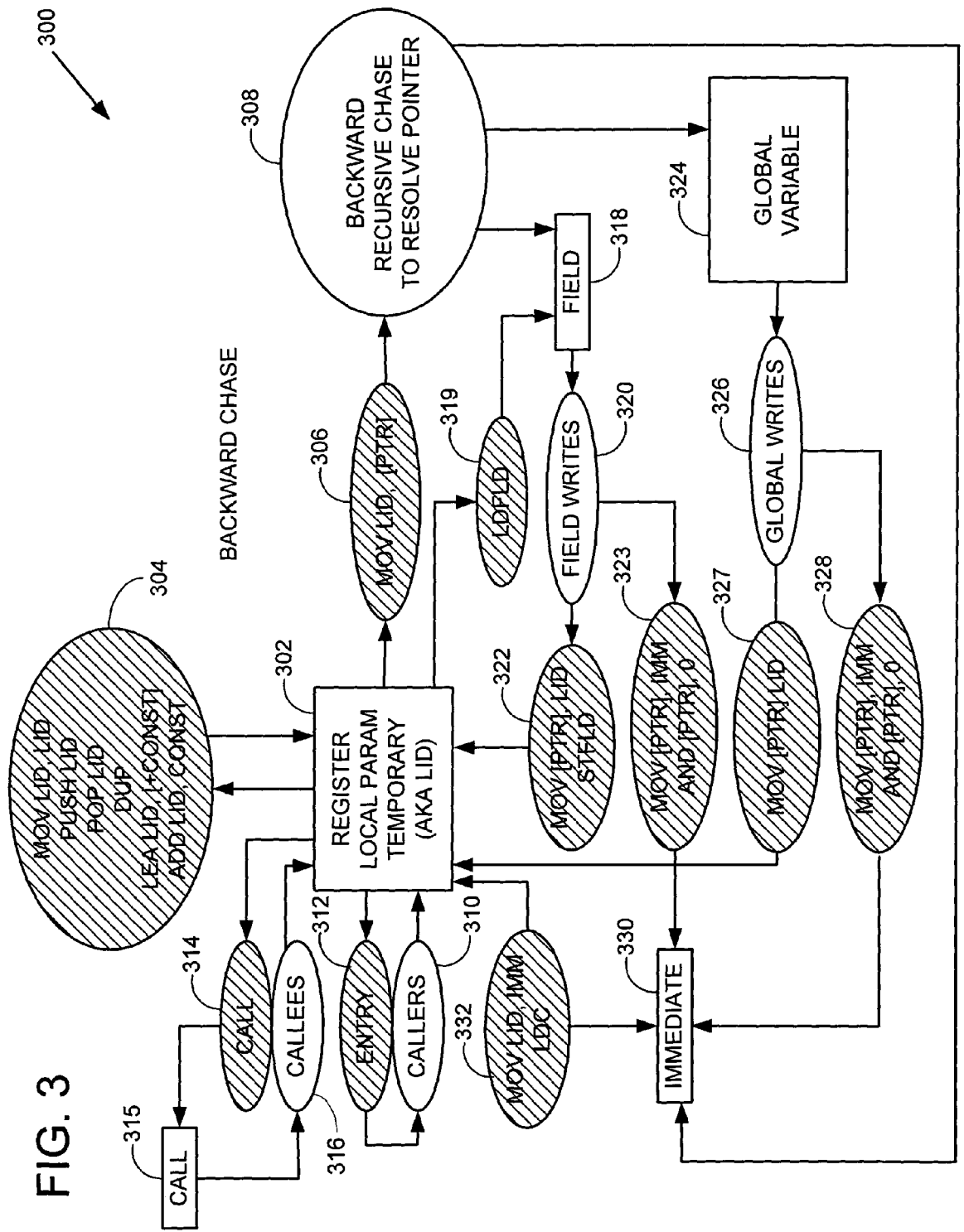
FIG. 3 is an exemplary state machine for data flow chasing backward through a program.

As previously stated, a data flow chase includes a chase start state. Once the start state is established, the DFG for a procedure is examined to determine the data movement interesting for the data in the start state. Within a procedure, the DFG will identify the registers, the locals and parameters (i.e., the valves stored on the stack for the procedure containing the start state), and the temporary variables (i.e., the variables created by the compiler that were not in the source code). Thus, the DFG is useful for following data flow through registers, locals, parameters and temporary variables within the operands of the instructions within a procedure. As shown in FIGS. 2 and 3, states traversed using the data flow graph are the states where control flow remains within a procedure, and data flow within the procedure is locally identifiable data (LID), such as registers, locals, parameters, and temporary variables 202, 204, 302, 304.

As an example, programs often create memory dynamically for different purposes using memory allocation functions (e.g., malloc( )). However, if a malloc function returns a null value, then the program must be prepared to exit gracefully since no memory is available. Specifically, it would be desirable to test whether a compare function follows each call to malloc( ), in order to determine if a program has provided for error checking required for a graceful exit. In such a case, data flow chasing is used to verify a program.

FIG. 4 is an exemplary program listing 400 with an overlay of an exemplary data flow graph of nodes shown as ovals, and edges shown as bidirectional arrows. A call to malloc( ), returns a value in the eax register in X86 architectures. Because the call to malloc 402 defines a value for the eax register, the call to malloc is a definition of data in a def-use chain. Following the data flow graph, the data in eax is moved to the stack frame 404, at the offset designed to store this information. Next, the data is compared to null 406. Thus, using the data flow graph shown in FIG. 4, the data flow is chased in order to determine whether the program includes the compare function. The edges of the DFG 408-410, are bidirectional so that chases can also be conducted backwards 200, 300, 308.

Of course, the user could continue walking forward in the PIR in order to verify that the listing included a conditional branch 412 (i.e., a branch if not equal statement), and even further 414 if it would be desirable to view the error handling.

So the user picks the point of interest where to begin the chase 402, and the direction they would like to chase (in this case forward), to find all the places where the data returned from malloc is used 404-406.

In one example, the user (i.e., a tool developer) requests via an application programming interface, the desired stop state and the chase returns the locations that match the desired stop state. Additionally, the data flow chain 408-410, or the ending location 406, can be returned, based on the user's request.

For example, in error detection, the binary file(s) of a program, a start state, and and an end state description are received as input, and the chase determines all paths from the start state that reach a state matching an end state description. In such a case, the start state could be every malloc call in the program, and the end state description would be to determine whether the compare function followed.

FIG. 5 is an exemplary program listing 500 with an overlay of an exemplary data flow graph. In this example, a dynamic load library call 502 is a point of interest in a backward data flow chase. A user may desire to determine where within binary files that libraries are loaded dynamically, and then chase backward to find out the name of any library loaded dynamically.

In such a case, the PIR is searched in order to identify calls 502 to the load library function. The chase backward examines the temporary variable created by the push eax instruction 504, since that is where the load library function expects to receive the library name. As shown, the DFG shows the data locations 502,504 and edges 512 where the implicit temporary variable is defined and used. Thus, the DFG is used to traverse data flow through the function or procedure. As shown, the described end state is where the global name for the library being loaded is moved into the eax register 510, so the backward chase never left the procedure. However, if the def-use chain reaches a call or return instruction, the chase will use a different representation (CG, FRL, GRL) to continue the chase when data flow exits the procedure.

Exemplary State Machines

FIG. 2 is an exemplary state machine for data flow chasing forward through a program. In order to understand how the exemplary forward chase state machine 200 facilitates the forward chase, the explanation proceeds with reference to FIGS. 6-9.

FIG. 6 is a source code listing 600 of an exemplary program. The source code is not required for data flow chasing. However, it is shown here to aid in the discussion, and if source code is available, then it may be presented to the user to show where a data flow chase corresponds with the source code line numbers (line numbers not shown).

FIG. 7 is an exemplary assembly language listing 700 of the compiled source code of FIG. 6. In practice, the binary code can be reverse compiled to show a user the assembly language for the binary code. The def-use chains or SSA data flow analysis methods do not help in the analysis once you leave the scope of a procedure or function. Along with providing a state status for traversing instructions in the data chase within a function 202, 204, 302, 304, the state machines provide states for resolving memory dereferences for pointers 206, 208, 224, 226, 228, 218, 220, 222, 306, 308, 318-332, states for resolving inter-procedural return and call instructions 210-216, 310-316, and states for resolving explicit store and load field instructions 219, 218, 220, 222, 319, 318, 320, 322, 323, 330, 332.

The two diagrams 200, 300 represent state machines used for forward 200 and backward 300 data flow chasing. The shaded states (e.g., 204, 206) represent identified next instructions of interest, and the unshaded states (e.g., 202, 208) represent the type of data source encountered in the instruction of interest.

A state includes an instruction address and the data identifier of for the data of interest being chased at that address (i.e., state=(instruction address, data identifier)).

The following is an exemplary forward chase using a state machine 200. In this example, the pointer "p" 602 contains the return from a call to malloc, and the user would like to chase p forward to find out what is done with the output from the call to malloc( ) 604.

Figures 8, 9:
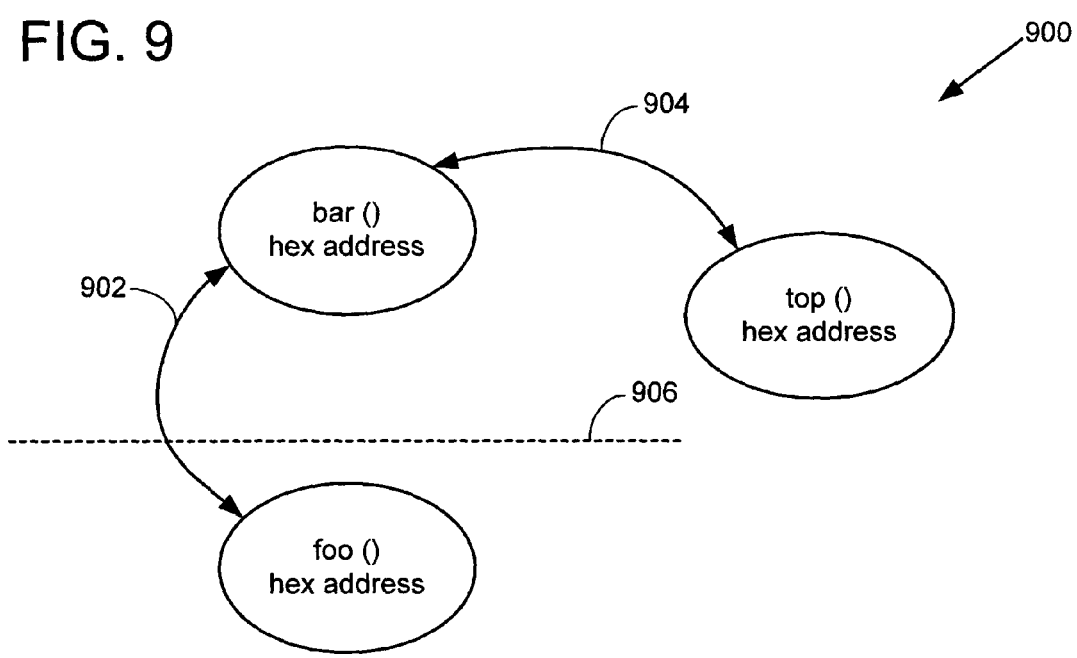
FIG. 8 is an exemplary trace of state changes while instructions are analyzed.
FIG. 9 is an exemplary call graph.

The bar( ) and foo( ) functions in the source code might compile to the assembly code shown in FIG. 7, at instruction A through H. Since the results of the call to malloc ( ) at instruction B are placed in the eax register as previously discussed, the forward chase begins as shown in FIG. 8, at state 202. In this discussion, the states 804 referred to in FIG. 8, correspond with the labeled states shown in FIG. 2, and the addresses 806 referred to in FIG. 8, refer to the instruction addresses 702 referred to in FIG. 7. Finally, the data column 808 in FIG. 8, refers to the location of the data at the corresponding address locations 702, in FIG. 7.

A state transition occurs when either data is relocated within an instruction (e.g., eax→[ebp+offset], as shown at 408) which is also known as a data instance transformation, or the state machine moves the instruction being examined (e.g., mov→cmp, as shown at 410), which is also known as an instruction change. FIG. 8 traces the state changes while either the data moves 408, or the instruction examined changes 410.

The state trace begins 802 at the 202 state. At the start state 802, the data of interest is returned into the eax register, so the state pair at 202 is "B, eax". This start state is supplied by the user, along with the binary code of interest, and an indication that a forward chase is desired. For example, the user may click an assembly language instruction presented (e.g., 700) on a graphical user interface.

First, the instruction being examined is moved using the data flow to the push instruction at address "C". The type of instruction is examined in order to determine what state should be entered. Since eax is locally identifiable data (LID), the "push LID" instruction causes a state change to state 204. In this state transition 810, the instruction being examined has changed from address "B" to address "C", but as expected, the data remains at "eax".

The push instruction pushes the eax contents onto the stack. Thus, the push creates a temporary variable on the stack, which is also locally identifiable data (LID), so in the transition 812 from state 204 back to state 202, data moves from the eax register to a temporary variable (i.e., $temp_0$) on the stack.

The next instruction "C" is a call to foo( ). In this state transition 814, the instruction has changed, but the data remains in the stack frame (i.e., $temp_0$). The instruction has changed from a push "C" to a call instruction "D". Call instructions are reflected at state 214. Since a call instruction is observed in the program listing "D", the call graph is examined in FIG. 9 in order to determine where the foo( ) function is located in the memory. Since the program under static analysis is being examined by a chase program, the call graph 900 includes a pointer to where foo( ) is located in memory. Thus, when the call to foo is executed at transition 816, the data is moved from a temporary on the stack, to an input parameter to foo (i.e., $parameter_0$). The dotted line 906 in FIG. 9, represents the situation where a procedure calls a procedure in another binary file (see also, e.g., FIG. 16, at 1620-1622). Thus, foo and bar may be in the same or a different binary file.

Next, the instruction being examined changes from the call instruction "D", to the move instruction "F" in foo( ), at transition 818 to state 202.

Next, the data is moved from the stack into the eax register in the transition 820 to state 204.

Thus, a call graph is used to transition data flow analysis across procedural boundaries for the program under static analysis. Once the PIR is created and a data flow graph for a present procedure is created, data flow graphs for a next procedure can be created (and discarded) lazily, after a procedure is identified within the CG for a data flow transition.

In this forward chase, had the parameter p been used in another call to procedure top (p) 606, another branch to the tree would be added with a transition from instruction "D" to the location of top as locatable in memory 904 at the call graph 900. This additional path trace would contain its own relevant states and transitions, as discussed in FIG. 8, for the call to foo( ).

FIG. 10 is an exemplary state transition trace for tracing backward from instruction 608 in procedure foo( ), to instruction 602 in foo( ). It enumerates similar states and transitions in the backward chase state machine 300, using the call graph's reverse edge 902 to bar( ).

Exemplary Pointer Memory Dereference

When examining instructions within a DFG for a procedure, a chase may encounter an instruction with a pointer memory dereference 206, 306 operand. For example, these instructions often attempt to assign something pointed to by a pointer (i.e., [ptr]), to a LID (i.e., a local parameter or a temporary). Thus, to continue the forward chase 208, or the backward chase 308, the backward chase 300 is used to determine where the pointer points.

For example, given a function with an input parameter of a pointer to a pointer (e.g., bar (int ** pp)), in order to continue a chase (whether forward or backward), the pointer is chased backward to see where the contents of the input to bar are loaded before bar is called with the input parameter. A call graph is used to see what functions are calling the bar function.

FIG. 11 is an exemplary table for resolving a pointer memory dereference. For example, if a pointer memory dereference 206, 306 is encountered in a forward or backward chase, a backward recursive chase is used to resolve possible targets of a pointer for a forward chase 208, and a backward recursive chase is used to resolve possible targets of a pointer during backward chases 308.

Based on the addressing mode 1102, the table tells what type of chase is performed 1103. For a global pointer addressing mode 1104 1108, the global reference list (GRL) resolves where the pointer points 1106, And the forward or backward chase will enter states 224 or 324.

If the addressing mode tells that the global is an array 1108, then the method attempts to determine 1110 which element of the array should be used to begin the chase again. For example, as shown in the table 1108, a global, a scale, and an offset can be determined within the addressing mode itself. Thus, only the register is unknown. If the register (i.e., "reg") value can be determined in a backward chase (e.g., reg=4), then the pointer is dereferencing the fourth element in the array, and the array contents can be used to continue the data flow chase, backward or forward, whichever is relevant. However, if the register value cannot be determined, then all elements in the array can be used to continue the chase, if desired. If the register value was known at compile time, then the addressing mode would have resolved to "[global+imm]", which is the global plus an offset.

Figures 12, 13:
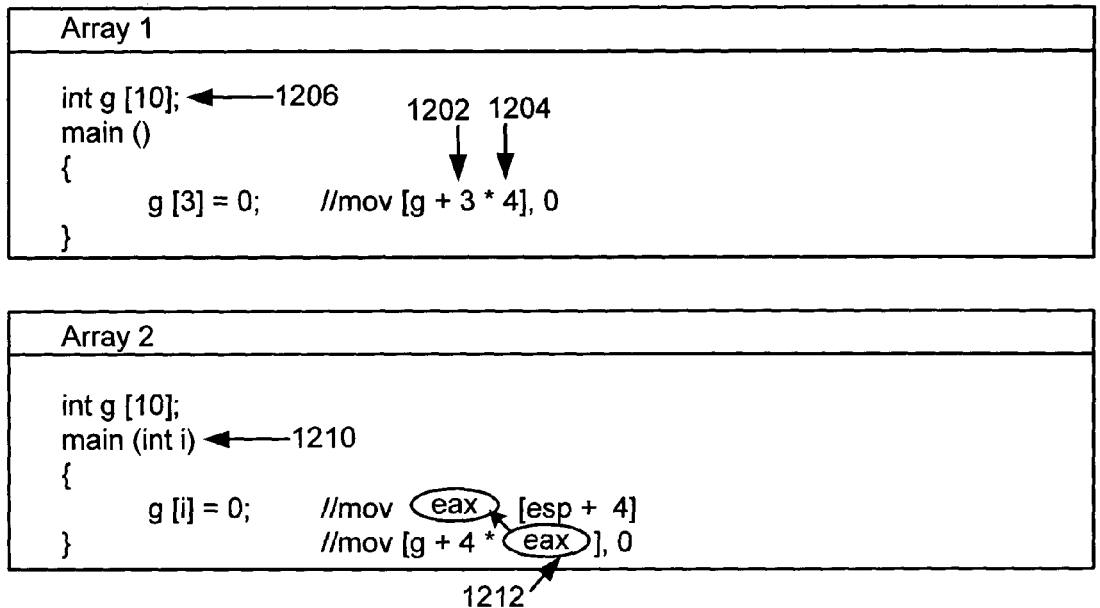
FIG. 12 is exemplary program listings of global arrays.
FIG. 13 is an exemplary data structure of a field reference list.

The array addressing modes are better understood with reference to FIG. 12. For a global array declaration 1206, since each integer element requires 4 bytes of memory 1204, the global address for an array element is determined by the array base address "g", plus 4 bytes 1204 times the desired element offset 1202, as determined by the global addressing form 1104.

For a global array where a call to main 1210, determines the array element of interest, since statically nobody known calls "main(i)", a backward chase will not resolve the unknown register contents 1212, or when the element is otherwise indeterminate, all 10 elements of g are chased 1114. However, if bar( ) called foo (5) and passed in 5, then "eax" 1212 can be chased back because it is determinate.

For the register and offset addressing mode 1116, the register could be a pointer, a field, a pointer to a global, pointer to an integer, or a pointer to a type, so the backward chase is performed to determine where it points. If it is a type, the field reference (FRL) is used to determine places used by the reference that are relevant to the chase 1120. Further, the FRL can be used to locate wherever in the binary code, that type/field is written to dynamically. A forward or backward chase that encounters a pointer to a field will enter states 218 or 318.

If the register can be chased to a global 1118, then the static data inside the data structure at the offset is used, and if it is written to dynamically all instructions that write to that location dynamically are determined from the global reference list (GRL). A forward or backward chase that encounters a pointer to a global will enter states 226 or 326.

Finally, if the addressing mode contains two registers 1127, 1124, then if the first register can be chased to a global, and the second register can be chased to an immediate, then the data inside the global at the offset is used to resolve the reference. Further, if the global is written dynamically at the offset, then the instructions that store into the global at the offset are used to continue the chase. If the second register cannot be chased to an immediate, then the data inside the global is used to continue the case. If the globals are written to dynamically, the instructions that store into the globals are used to continue the chase, as determined by the GRL. If the first register can be chased to a type, then instructions that store into the field array are determined from the FRL. Thus form 1128 can lead to both the field 218, 318 and global 224, 324 states during a forward or backward chase.

Note that pointer dereferencing analysis is done locally within procedures while building the DFG so that references to locals, parameters, and temporaries are already locally resolved.

Exemplary Field Reference List

A field is a member of a class or data structure (e.g., an array field, a data member, etc.). A field reference list or graph (FRL) includes pointers to places in the program where a defined field is used.

FIG. 13 is an exemplary data structure of a field reference list (FRL). An FRL identifies field reference assignments 1302 within a program 1304, and identifies where field references 1306 are used within a program 1308. If the field reference 1302 is set equal to a data flow value of interest, then the chase can proceed wherever the field reference is used 1308, and continue the analysis. Thus, an FRL is like a def-use chain, but refers to fields. Although def-use chain can be used within a procedure to determine uses for fields (e.g., "print(t->i)."), this does not help when a use is elsewhere in the program. Further, going up and down the call graph may not be as efficient because a use 1308 can be relatively far away from the present procedure. A FRL can be used to go wherever a field is written to 1302, and then chase forward or back to see how it is used. Often, there are only a small set of places in a FRL where a particular field is referenced, so the FRL can be very helpful.

Thus, the FRL is one of the states in the state machines 218, 318. So if a store field instruction is encountered 219, or a load field instruction is encountered 319, or if a pointer dereference is chased back to a field reference 208, 308, the state machines use the FRL 218, 318 to obtain the field reference locations, and the data flow chase resumes forward or backward from there. If a backward chase from a pointer memory dereference 206, 306, chases back to a pointer to a type that has fields, the FRL is used.

For example, in a forward chase, if a pointer memory dereference is encountered 206, and a backward chase resolves to a field in the field reference 218, then the chase continues wherever the field reference is read 220, and these point to an instruction 222 where the forward chase continues.

As previously stated, if the backward chase resolves to a data structure that has fields 1120, 1126, but the field within the data structure cannot otherwise be determined, the FRL is used to determine places within the program where that data structure is written, and plural chases resume from each such address, as the forward or backward chase resumes.

FIG. 14 is an exemplary program listing helpful in describing a field reference list feature. In this example, the program 1400 sets the field i equal to zero 1402, and then passes the pointer to the class containing the reference into foo 1404. In this example, the call graph is not used to advance the data flow chase from the call 1404 to the foo procedure 1406, because the reference within the class (or data structure) is not easily resolved with the CG. Instead, the FRL points directly to where the defined field 1402 is used 1408 elsewhere in the program. The FRL is used to take the data flow chase directly to where the field references are written to 320, or read from 220.

Exemplary Global Reference List

A global variable is a variable defined outside the scope of a procedure. A global reference list points to locations with the program that refer to the global variable.

FIG. 15 is an exemplary global reference list (GRL). The GRL is a listing 1500 of global variables defined in the program 1502 along with a pointer to where the definition is located in the program 1506. For each defined variable the GRL indicates where the reference is used 1504, along with a pointer to the use location 1508.

When a chase locates a global variable in the program, the GRL 224, 324, is useful for resuming the chase (forward or back) wherever the global variable is read 226, or written to 326. These instruction pointers 1508 to the global references, allow skipping directly to the instructions in the program where the forward chase 228, or backward 327, 328 should resume.

Exemplary Pointers into Program

A call graph (CG) has pointers to different procedures in the program. The program has instructions in a static order, while the call graph, the data flow graph, the field reference list, and the global reference list have pointers into the program abstraction. These graphs and lists map pointers into the program abstraction (see, e.g., PIR, IR, etc.) for different reasons. State machines walk forward or backward through the program abstraction using the graphs and lists which have pointers into points of interest in the program.

The resulting data flow chase uses the binary input, start state, and direction indication, and the created graphs and lists, to piece together as needed, instead of building all at once in advance, the desired data flow points of interest and step-wise path.

The data flow graph is useful within a procedure because it creates def-use (or SSA) patterns within a procedure, which allows removing or ignoring the clutter of instructions not relevant to the identified data movement within the procedure.

Exemplary Information Representations

Figure 16:
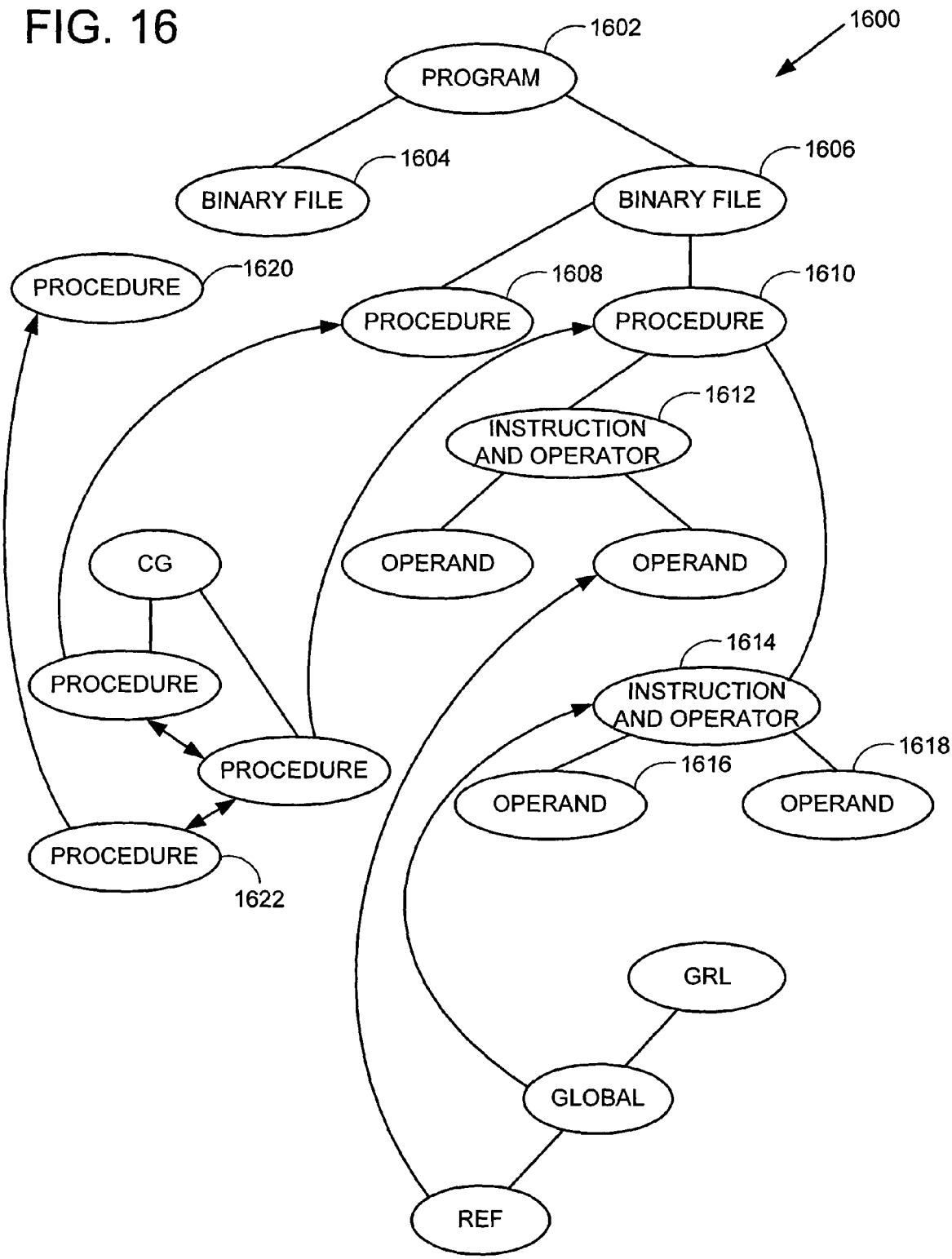
FIG. 16 is an exemplary graph of an information representation useful for data flow chasing.

FIG. 16 is an exemplary method and system for holding and traversing information 1600 useful for data flow chasing. When binary files representing a program 1602 are input into the system, the program is traversed at increasingly lower levels of abstractions, starting with a binary file 1606, each procedure 1608-1610 within the binary file is traversed to identify the procedure symbols, and each instruction 1612-1614 within each procedure is traversed to identify instructions, and each instruction is traversed to identify operands 1616-1618. For this specification, the terms procedure, function, or method call are interchangeable. An internal representation of the program is created. This internal representation of the program contains information that is useful for data flow analysis. One such method and system for creating an internal representation is discussed in Srivastava, A., et al., "Vulcan: Binary Transformation in a Distributed Environment," Technical Report, MSR-TR-2001-50, Microsoft Research, Apr. 20, 2001.

Using such an internal representation (IR) is helpful as a set-up for acquiring the information useful for traversing the state machines described herein. For example, by traversing this IR, the malloc instructions within the program are more easily located as required for the start state described with reference to FIG. 6. In another example, the IR is traversed to create a CG, a FRL, a DFG, or a GRL.

Exemplary Application Programming Interface

FIGS. 17 and 18 is an exemplary application programming interface for creating chase objects for backward or forward chases through an internal representation of a program.

For example, once a program has been traversed to create an internal representation 1602, an instruction corresponding to load library function call is located within the program 1614. As shown at FIG. 19, a pointer to a load library function 1902 is used to locate a load library operand 1618, which is a parameter 1904 to the call instruction. This parameter 1906 is then used to create a chase object 1908. The chase object is then used as an input parameter 1910, with a description of a chase exit state 1912, to chase back from each such load library call, and enumerate the name of any DLL that is loaded dynamically 1914 within the program.

The described application program interface (API) 1700, 1800, consists of methods and data related to a VChase interface 1702. The Create method 1704 is used to specify the initial start state for the chase. A destroy method 1706 is provided for cleaning up memory after the chase has been used. The chase types 1708 correspond to the states in FIGS.

2 and 3—and the current chase type of an object can be determined using the get type API 1710. The chase location is available using the get location APIs 1712, and there is a shortcut for determining if the current location is a call 1802. There are APIs to access the data location of the chase object 1714. Since the chase can diverge into multiple paths, there is an API to access the other paths in the state 1804. There are APIs to chase one step in the state machine 1806, as well as an API to a chase back to a type (or instance of a type) 1808. There are also APIs to chase until a condition is reached 1810 The more advanced chase to a condition 1818 allows specifying several different actions 1812 using a chase done callback interface 1814 1816, Also provided are some example chase stop conditions 1820.

Exemplary System

Figure 20:
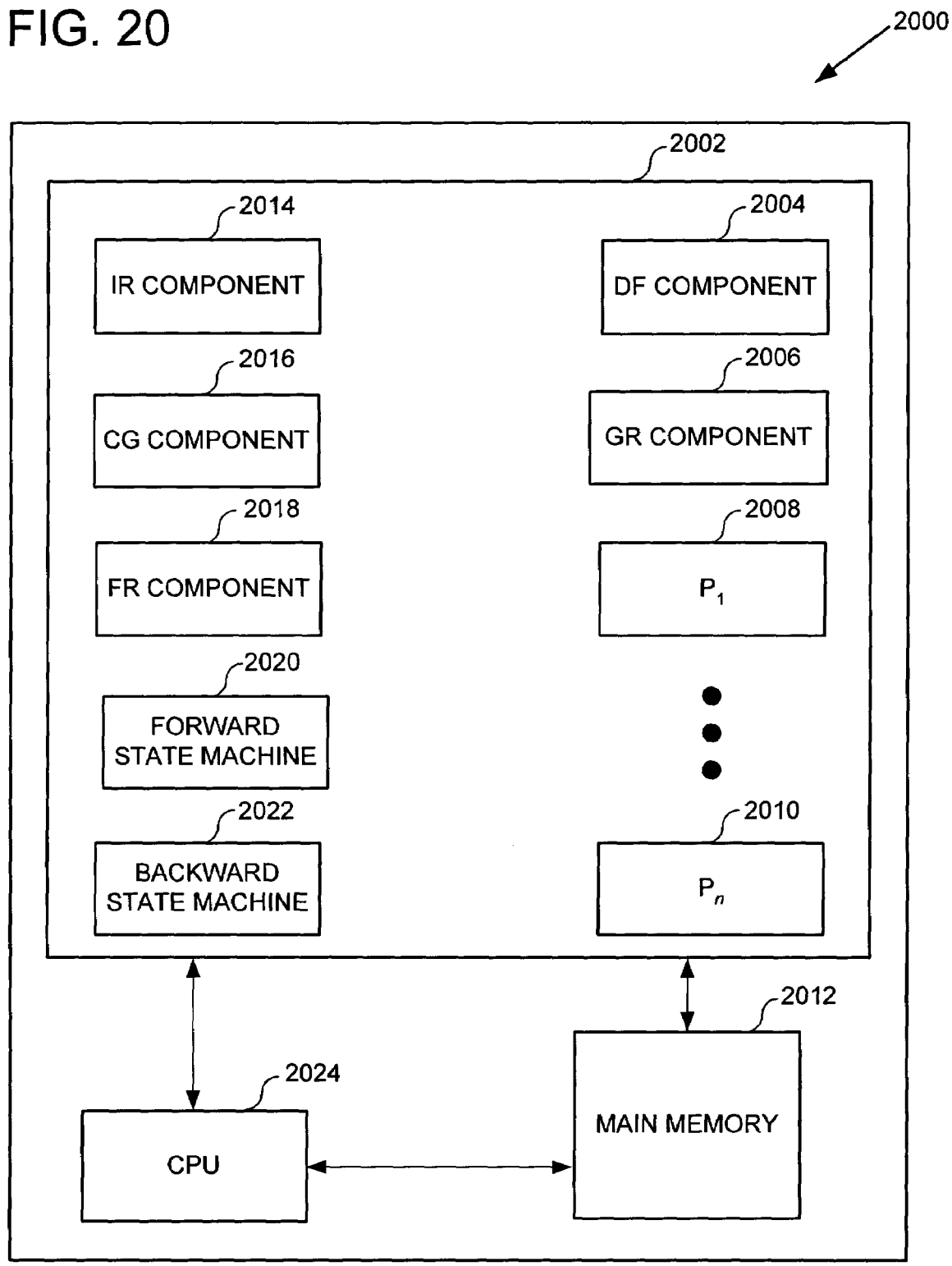
FIG. 20 is an exemplary block diagram showing an exemplary system for performing data flow chasing.

FIG. 20 is an exemplary block diagram showing an exemplary system for performing data flow chasing. The system 2000 includes a central processing unit 2024, volatile memory 2012 and non-volatile memory 2002, software files 2004-2010, 2014-2022, are moved in and out of volatile memory 2012 and cache (not shown) as required for processing the described data flow chasing methods and system.

An internal representation (IR) component 2014 read binary code in one or more binary files 2008-2010 that make up a computer program. The IR component creates an internal representation of the program identifying procedures and instructions in the program, and stores the IR in a data structure such as a list, tree or graph.

A call graph (CG) component 2016 reads the IR and creates a call graph (list or tree) of procedures within the program that call or are called by other procedures.

A field reference (FR) component 2018, creates a data structure (list, tree, or graph) holding field reference definitions and uses within the IR.

A data flow (DF) component 2004, creates a data structure holding the data flow for relevant instructions within a procedure (e.g., def-use or SSA).

A global reference (GR) component 2006, creates a data structure (list, tree, or graph) holding global references and uses within the IR.

Finally, forward 2020 and backward 2022 chase components reference data structures (e.g., state machines) that identify instructions within a DF graph trace. Based on the identified instructions (e.g., operator and operands), the state machines 2020-2022 direct the data flow chase to transition the chase to a DF graph of another procedure in the CG graph, (2) transition the chase to an instruction indicated in the GR list, (3) transition the chase to an instruction indicated in the FR list, (4) chase backwards to locate an instruction indicated by a pointer dereference, and, or (5) continue the chase through the DFG for the present procedure.

An end state can be indicated so that the state machines know when to stop the chase, or as each new state is identified during the chase, the user can decide to end the chase or request the next state in the chase.

Computing Environment

Figure 21:
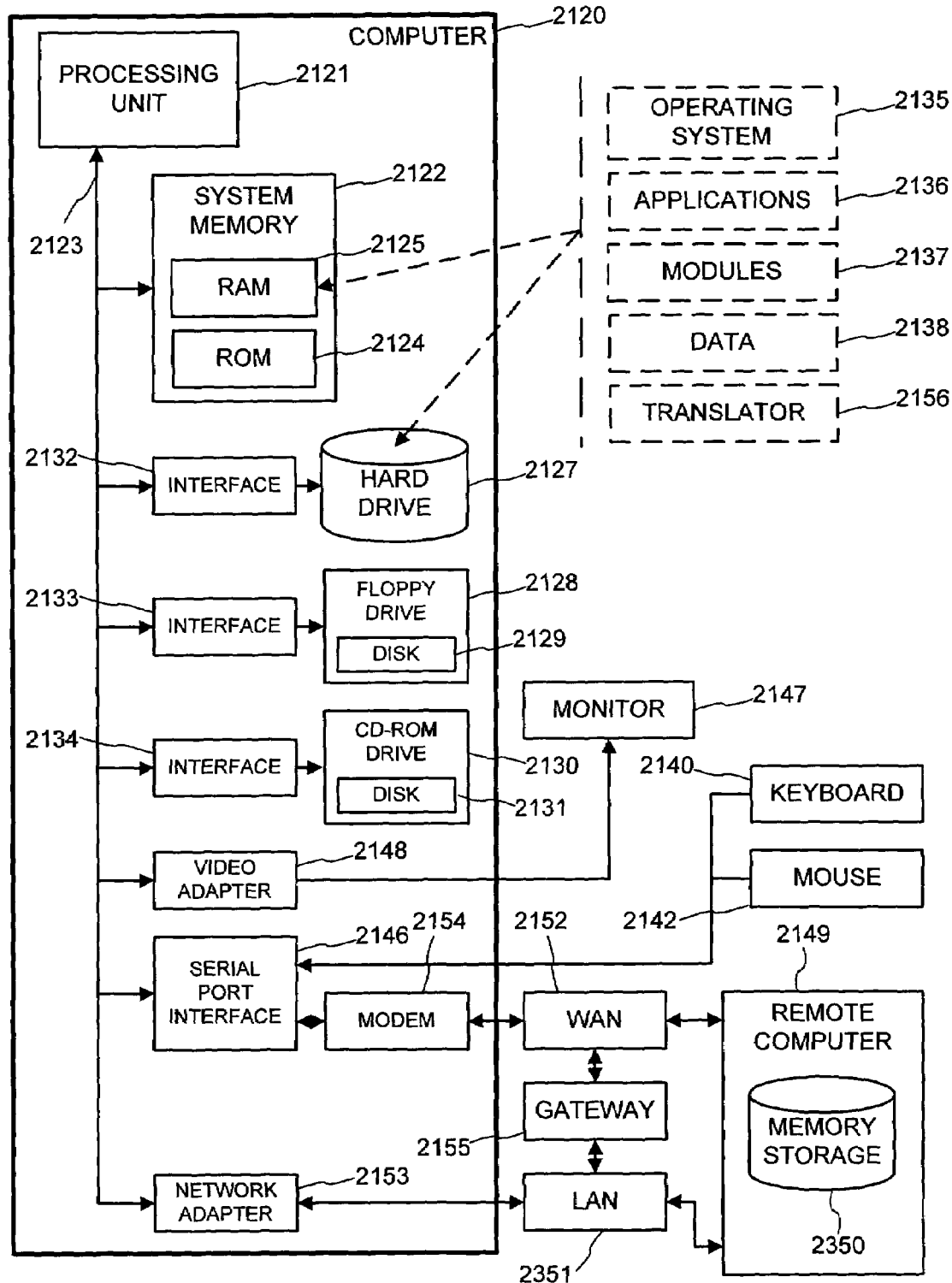
FIG. 21 is a block diagram of a distributed computer system implementing the described technologies.

FIG. 21 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 21, an exemplary system for implementation includes a conventional computer 2120 (such as personal computers, laptops, servers, mainframes, and other variety computers) includes a processing unit 2121, a system memory 2122, and a system bus 2123 that couples various system components including the system memory to the processing unit 2121. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 2121.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 2124 and random access memory (RAM) 2125. A basic input/output system (BIOS), containing the basic routines that help to transfer information between elements within the computer 2120, such as during start-up, is stored in ROM 2124.

The computer 2120 further includes a hard disk drive 2127, a magnetic disk drive 2128, e.g., to read from or write to a removable disk 2129, and an optical disk drive 2130, e.g., for reading a CD-ROM disk 2131 or to read from or write to other optical media. The hard disk drive 2127, magnetic disk drive 2128, and optical disk drive 2130 are connected to the system bus 2123 by a hard disk drive interface 2132, a magnetic disk drive interface 2133, and an optical drive interface 2134, respectively. The drives and their associated computer-readable media provide nonvolatile storage of data, data structures, computer-executable instructions, etc. for the computer 2120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 2125, including an operating system 2135, one or more application programs 2136, other program modules 2137, and program data 2138; in addition to an implementation 2156.

A user may enter commands and information into the computer 2120 through a keyboard 2140 and pointing device, such as a mouse 2142. These and other input devices are often connected to the processing unit 2121 through a serial port interface 2146 that is coupled to the system bus, but may be connected by other interfaces, such as a parallel port, game port or a universal serial bus (USB). A monitor 2147 or other type of display device is also connected to the system bus 2123 via an interface, such as a video adapter 2148. In addition to the monitor, computers typically include other peripheral output devices (not shown), such as speakers and printers.

The computer 2120 operates in a networked environment using logical connections to one or more remote computers, such as a remote computer 2149. The remote computer 2149 may be a server, a router, a peer device or other common network node, and typically includes many or all of the elements described relative to the computer 2120, although only a memory storage device 2150 has been illustrated. The logical connections depicted include a local area network (LAN) 2151 and a wide area network (WAN) 2152. Such networking environments are commonplace in offices, enterprise-wide computer networks, intranets and the Internet.

When used in a LAN networking environment, the computer 2120 is connected to the local network 2151 through a network interface or adapter 2153. When used in a WAN networking environment, the computer 2120 typically includes a modem 2154 or other means for establishing communications (e.g., via the LAN 2151 and a gateway or proxy server 2155) over the wide area network 2152, such as the Internet. The modem 2154, which may be internal or external, is connected to the system bus 2123 via the serial port interface 2146. In a networked environment, program modules depicted relative to the computer 2120, or portions thereof, may be stored in the remote memory storage device. It will be appreciated that the network connections shown are exemplary and other means of establishing a communications link between the computers may be used.

Alternatives

Having described and illustrated the principles of our invention with reference to illustrated examples, it will be recognized that the examples can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

I claim:

1. A static data flow analysis method comprising:
receiving a start state from a user;
chasing a data flow instance of the start state through a first data flow graph local to a first procedure until a procedure transition instruction is encountered;
resolving the transition instruction to a second procedure pointed to by a call graph; and
chasing the data flow instance into a data flow graph local to the second procedure.

2. The method of claim 1, further comprising:
encountering a pointer dereference operand while chasing through the first data flow graph;
chasing backward to resolve where the pointer points; and
continuing chasing the data flow instance from the resolved pointer dereference operand.

3. The method of claim 2 wherein the resolved pointer dereference is a global type, and chasing continues at plural instructions that reference the global as operands.

4. The method of claim 2 wherein the resolved pointer dereference is a field reference type, and chasing continues at plural instructions that reference the field reference as operands.

5. The method of claim 1 wherein the procedure transition instruction is a call instruction, and the data flow instance chase is a forward chase.

6. The method of claim 1 wherein the procedure transition instruction is a first instruction of the second procedure, and the data flow instance chase is a backward chase.

7. The method of claim 1 wherein the data flow graphs comprise pointers to an internal representation of a program.

8. The method of claim 7 wherein the internal representation comprises a graph data structure.

9. The method of claim 1 wherein the call graph comprises pointers to an internal representation of a program.

10. The method of claim 1, wherein a state machine directs data flow chase through alternating states comprising instruction change states and data transformation states.

11. The method of claim 1 wherein the data flow graph of the second procedure is built after the transition is resolved to the procedure.

12. The method of claim 1 wherein the inputs to the method comprise binary code, and the start state comprises a data instance and an instruction address in the binary code.

13. A method comprising:
receiving binary code and a start state;
creating from binary code a procedures and instructions representation;
creating a call graph comprising pointers to procedures in the procedures and instructions representation;
creating a data flow graph for a procedure comprising the start state, the data flow graph comprising pointers to instructions in the procedures and instructions representation;
chasing a data instance of the start state through instructions in the data flow graph corresponding to states in a state machine; and
upon encountering a procedure transition instruction in the data flow graph, corresponding to a state in the state machine representing the call graph, transitioning the data instance chase to a data flow graph of a procedure identifiable in the call graph.

14. The method of claim 13 further comprising:
upon encountering a pointer dereference in an instruction in a data flow graph corresponding to a state in the state machine representing a pointer dereference table, performing a backward recursive search indicated in the pointer dereference table according to the addressing mode of the pointer dereference, and identifying a location in the backward recursive search.

15. The method of claim 14 wherein the location indicates a field reference definition, and the data instance chase resumes at an instruction indicated by a field reference list.

16. The method of claim 14 wherein the location indicates a global reference definition, and the data instance chase resumes at an instruction indicated by a global reference list.

17. A computer readable medium comprising instructions for performing the method of claim 13.

18. A computer readable medium having instructions for performing a method comprising:
- receiving a start state from a user;
- chasing a data flow instance of the start state through a first data flow graph local to a first procedure until a procedure transition instruction is encountered;
- resolving the transition instruction to a second procedure pointed to by a call graph; and
- chasing the data flow instance into a data flow graph local to the second procedure.

19. The computer readable medium of claim 18 further comprising:
- encountering a pointer dereference operand while chasing through a data flow graph;
- chasing backward to resolve where the pointer points; and
- continuing chasing the data flow instance from the resolved pointer dereference operand.

20. The computer readable medium of claim 18 further comprising:
- the procedure transition instruction is a call instruction, and the data flow instance chase is a forward chase.

21. A computer-based service comprising:
- means for creating an internal representation of a program;
- means for creating a data flow graph for procedures in the internal representation comprising pointers to instructions in the internal representation;
- means for creating a call graph comprising pointers to the procedures;
- means for creating a field reference list comprising pointers to field references in the internal representation;
- means for receiving a start state from a user;
- means for chasing a data flow instance of the start state through the data flow graph until a procedure transition instruction is encountered; and
- means for resolving the procedure transition instruction to a second procedure pointed to by the call graph.

22. The computer-based service of claim 21 wherein the internal representation is a list data structure.

23. The computer-based service of claim 21 wherein the internal representation is a tree data structure.

24. The computer-based service of claim 21 wherein the internal representation is a graph data structure.

25. The computer-based service of claim 21 wherein the data flow graph edges are bidirectional.

26. The computer-based service of claim 21 wherein the call graph edges are bidirectional.

27. A computer system including a processor and memory, the memory comprising:
- a component for receiving binary files and creating internal representations;
- a component for accessing internal representations and creating a call data structure;
- a component for accessing internal representations and creating data flow data structures associated with procedures of the internal representation,
- a component for accessing internal representations and creating a global reference data structure;
- a component for receiving a start state from a user;
- a component for chasing a data flow instance of the start state through one of the data flow data structures until a procedure transition instruction is encountered;
- a component for resolving the procedure transition instruction to a second procedure pointed to by the call data structure; and
- a component for chasing the data flow instance into the data flow data structure associated with the second procedure.

28. The computer system of claim 27 wherein the memory further comprises a component for accessing internal representations and creating a field reference data structure.

29. The computer system of claim 28 wherein the global reference data structure and the field reference data structure are list data structures.

30. The computer system of claim 27 wherein the call data structure and the data flow data structures are graph data structures.

* * * * *